United States Patent
Hussain (12)

(10) Patent No.: US 6,243,367 B1
(45) Date of Patent: Jun. 5, 2001

(54) SYSTEMS AND METHODS FOR PROVIDING A CLIENT-SERVER ARCHITECTURE FOR CDMA BASE STATIONS

(75) Inventor: Amir Hussain, Richardson, TX (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/001,934

(22) Filed: Dec. 31, 1997

(51) Int. Cl.⁷ .............................. H04Q 7/00; H04Q 7/20; H04Q 7/24; H04B 7/216; G06F 15/16
(52) U.S. Cl. ...................... 370/329; 370/335; 370/338; 455/422; 709/203
(58) Field of Search ...................... 370/328, 329, 370/338, 335, 352, 356, 408; 340/825.03; 455/38.3, 422, 507, 517, 524, 525; 709/203

(56) References Cited

U.S. PATENT DOCUMENTS

| | | | |
|---|---|---|---|
| 5,329,531 | * | 7/1994 | Diepstraten et al. ............... 370/94.2 |
| 5,418,838 | * | 5/1995 | Havermans et al. ................ 379/60 |
| 5,555,260 | * | 9/1996 | Rinnback et al. .................... 370/84 |
| 5,617,418 | * | 4/1997 | Shirani et al. ....................... 370/465 |
| 5,699,356 | * | 12/1997 | Beever et al. ....................... 370/329 |
| 5,710,882 | * | 1/1998 | Svennevik et al. ............. 395/200.12 |
| 5,805,597 | * | 9/1998 | Edem .................................. 370/445 |
| 5,889,770 | * | 3/1999 | Jokiaho et al. ..................... 370/337 |
| 5,913,162 | * | 6/1999 | Gourdin et al. .................... 455/424 |
| 5,991,628 | * | 11/1999 | Pedziwiatr et al. ................. 455/443 |

* cited by examiner

*Primary Examiner*—Alpus H. Hsu
*Assistant Examiner*—Duc Ho
(74) *Attorney, Agent, or Firm*—John C. Han

(57) ABSTRACT

There is disclosed, for use in a wireless communication system, an infrastructure comprising 1) a plurality of client base transceiver stations operable to transmit voice and data signals to mobile units within the wireless communication system and to receive voice and data signals from the mobile units; and 2) a base station server coupled to the plurality of client base transceiver stations via a client-server backbone architecture, the base station server operable to transfer the voice and data signals between the plurality of base transceiver stations and an external wired communication system.

20 Claims, 4 Drawing Sheets

SYSTEMS AND METHODS FOR PROVIDING A CLIENT-SERVER ARCHITECTURE FOR CDMA BASE STATIONS

TECHNICAL FIELD OF THE INVENTION

The present invention is directed, in general, to communication networks and, more specifically, to a wireless telephone network employing variable power transmitters.

BACKGROUND OF THE INVENTION

In 1996, more than 75 million people worldwide used cellular telephones. Reliable predictions indicate that there will be over 300 million cellular telephone customers by the year 2000. Within the United States, cellular service is offered not only by dedicated cellular service providers, but also by the regional Bell companies, such as U.S. West, Bell Atlantic and Southwestern Bell, and the national long distance companies, such as AT&T and Sprint. The enhanced competition has driven the price of cellular service down to the point where it is affordable to a large segment of the population.

This competition has also led to a rapid and sweeping innovation in cellular telephone technology. Analog cellular systems are now competing with digital cellular systems. Older frequency division multiple access (FDMA) and time division multiple access (TDMA) systems are now competing with code division multiple access (CDMA) systems. In order to maximize the number of subscribers that can be serviced in a single cellular system, frequency reuse is maximized by making individual cell sites smaller and using a greater number of cell sites to cover the same geographical area. In a typical system upgrade, several existing adjacent cell site are subdivided into multiple smaller sites having different frequency assignments. Care is taken to maximize the distance between cells using the same frequency range. Each of the smaller cell sites may be further subdivided by use of a sectored antenna that splits the cell site into, for example, three 120 degree sectors. The multi-sector, multi-frequency architecture greatly increases the number of users that can be served.

Accordingly, the increased number of base transceiver stations and/or sectored antennas has resulted in increased infrastructure costs. To offset this increased cost, cellular service providers are eager to implement any innovations that may reduce equipment costs, maintenance/repair costs, and operating costs, or that may increase service quality/reliability, and the number of subscribers that the cellular system can service. Much of this innovation has focused on service quality improvements, such as expanded digital PCS services, on user equipment improvements, such as smaller and lighter cellular phone handsets having a longer battery life, or on infrastructure cost reduction, such as smaller, cheaper, more reliable transceivers for the cellular base stations.

Data traffic problems are encountered as cell sites become smaller in conventional wireless architectures. The base transceiver station serving each cell site is usually connected to a base station controller by a T1 line. Each active call being handled by the base transceiver station is assigned to a dedicated time slot on the T1 line. This type of connection has numerous drawbacks. The T1 line has a relatively narrow bandwidth. The base station controller frequently collects from each base transceiver station out-of-performance data associated with the base transceiver station and the active calls it is handling. Performing this function requires a large amount of bandwidth, generally more than the T1 can support simultaneously with on-going voice data transfers.

This problem is worsened by the increased use of high-bandwidth applications by the mobile units. For example, many of the mobile units may be portable computers executing multimedia applications, or video devices, such as video conference equipment. The T1 bandwidth assigned to each mobile unit is simply too small to effectively perform these high-bandwidth applications. The result is that many video applications exhibit a flickering image and many audio applications exhibit a stuttering effect.

There is therefore a need in the art for improved wireless systems that provide reliable high-bandwidth communication links for mobile devices capable of performing multimedia and video applications. More particularly, there is a need for improved wireless infrastructures that provide a guaranteed amount of bandwidth with minimum latency to each active mobile unit.

SUMMARY OF THE INVENTION

To address the above-discussed deficiencies of the prior art, it is a primary object of the present invention to provide, for use in a wireless communication system, an infrastructure comprising 1) a plurality of client base transceiver stations operable to transmit voice and data signals to mobile units within the wireless communication system and to receive voice and data signals from the mobile units; and 2) a base station server coupled to the plurality of client base transceiver stations via a client-server backbone architecture, the base station server operable to transfer the voice and data signals between the plurality of base transceiver stations and an external wired communication system.

In one embodiment of the present invention, the base station server and the plurality of base transceivers stations communicate via an ISOchronous Ethernet client-server protocol.

In a preferred embodiment of the present invention, each of the plurality of client base transceiver stations operates under a CDMA access protocol.

In another embodiment of the present invention, each of the plurality of client base transceiver stations is assigned to selected transmit and receive frequencies. In certain embodiments of the present invention, the selected transmit and receive frequencies assigned to the plurality of client base transceiver stations are mutually exclusive.

In other embodiments of the present invention, the base station server assigns a sub-channel in the ISOchronous Ethernet to a selected wireless communication link between one of the plurality of base transceiver stations and a mobile unit.

In still another embodiment of the present invention, the base station server receives from at least one of the plurality of base transceiver stations RF performance data related to a selected wireless communication link between the at least one base transceiver station and a selected mobile unit.

In yet another embodiment of the present invention, the base station server comprises a base station transceiver operable to transmit voice and data signals to the mobile units and to receive voice and data signals from the mobile units.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present invention in this patent document are by the way of illustration only and should not be construed in any way to limit the scope of the invention. Those skilled in the art will understand that the principles of the present invention may be implemented in any suitably arranged process facility.

Figure 1:
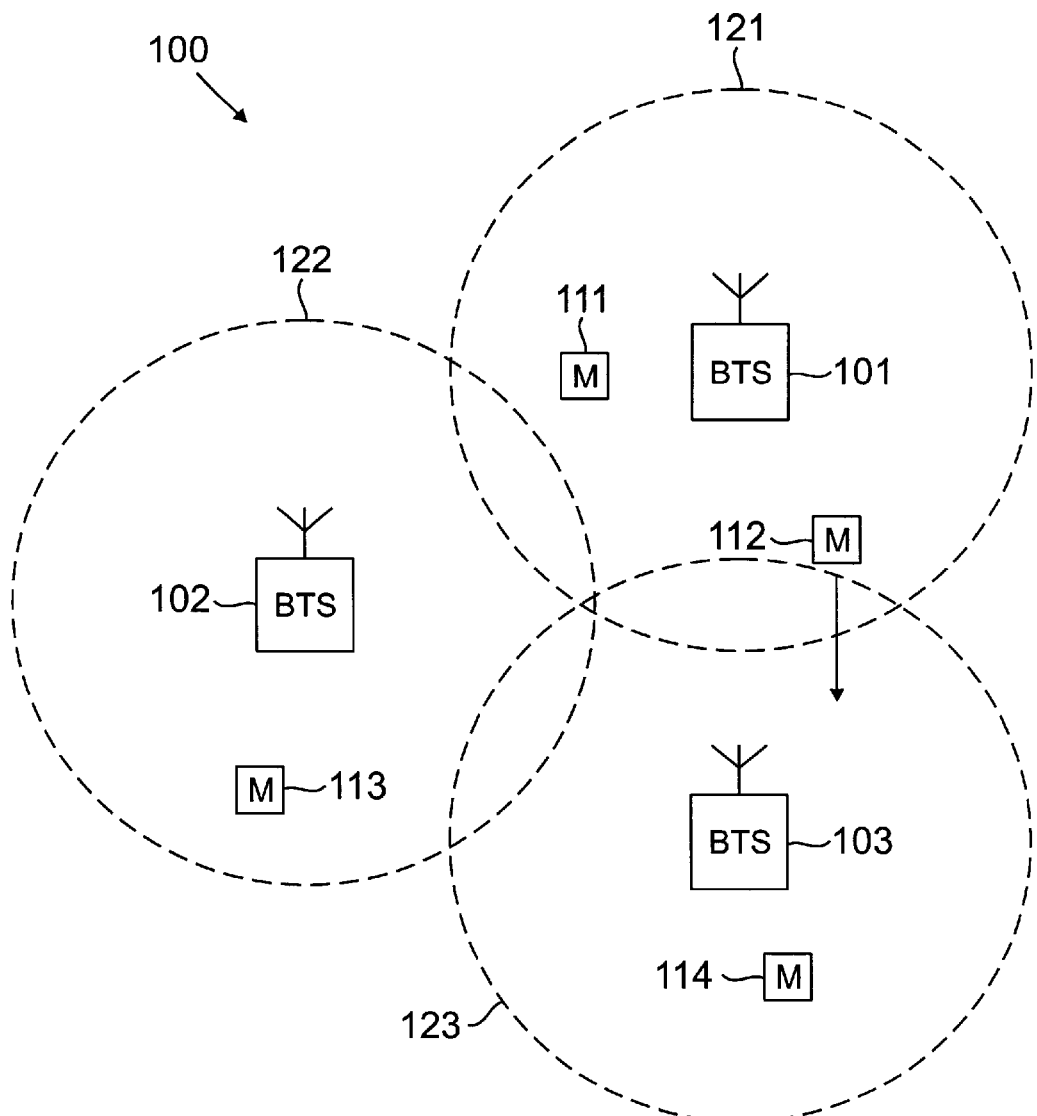
FIG. 1 illustrates an exemplary wireless communication system according to one embodiment of the present invention.

FIG. 1 illustrates an exemplary wireless communication system 100 according to one embodiment of the present invention. The wireless telephone network 100 comprises a plurality of cell sites 121–123, each containing one of the base transceiver stations, BTS 101, BTS 102, or BTS 103. In a preferred embodiment of the present invention, the wireless communication system 100 is a CDMA-based system. Base transceiver stations 101–103 are operable to communicate with a plurality of mobile units (M) 111–114. Mobile units 111–114 may be any suitable cellular devices, including conventional cellular telephones, PCS handset devices, portable computers, metering devices, and the like.

Dotted lines show the approximate boundaries of the cells sites 121–123 in which base transceiver stations 101–103 are located. The cell sites are shown approximately circular for the purposes of illustration and explanation only. It should be clearly understood that the cell sites may have other shapes, such as hexagonal, depending on the cell configuration selected and natural and man-made obstructions. As will be explained below in greater detail in connection with FIG. 3, in a preferred embodiment of the present invention, BTS 101, BTS 102 and BTS 103 transfer voice and data signals between each other and the public telephone system (not shown) via an ISOchronous Ethernet network.

In the exemplary wireless communication system 100, mobile unit 111 is located in cell site 121 and is in communication with BTS 101, mobile unit 113 is located in cell site 122 and is in communication with BTS 102, and mobile unit 114 is located in cell site 123 and is in communication with BTS 103. The mobile unit 112 is located in cell site 121, close to the edge of cell site 123. The direction arrow proximate mobile unit 112 indicates the movement of mobile unit 112 towards cell site 123. At some point as mobile unit 112 moves into cell site 123 and out of cell site 121, a "handoff" will occur.

A "handoff" is a well-known process for transferring control of a call from a first cell to a second cell. For example, if mobile unit 112 is in communication with BTS 101 and senses that the signal from BTS 101 is becoming unacceptably weak, mobile 112 may then switch to a BTS that has a stronger signal, such as the signal transmitted by BTS 103. Mobile unit 112 and BTS 103 establish a new communication link and a signal is sent to BTS 101 and the public telephone network to transfer the on-going voice and/or data signals through the BTS 103. The call is thereby seamlessly transferred from BTS 101 to BTS 103.

In a conventional wireless communication system, the transmitters in BTS 101, BTS 102 and BTS 103 transmit outbound signals at a selected RF output power level according to the size (and perhaps the shape) of the coverage area of the cell site. The RF output power level is set to a minimum level that ensures that a mobile unit located near the boundary of each cell site receives a sufficiently strong signal to form a reliable communication link. Each mobile unit transmits control signal(s) to a base transceiver station to increase the RF output power level of the base transceiver station if the signal quality falls below a minimum acceptable threshold. Additionally, the base transceiver stations transmit power control signal(s) to the mobile units to increase or decrease the RF output power levels of the mobile units in order to ensure that the RF signals received from the mobile units are received at approximately equal power.

In a preferred embodiment of the present invention, the transmitters in the wireless communication system 100 include variable power transmitter amplifiers that may reduce the DC prime power consumed by one or more of the base transceiver stations 101–103 whenever a base transceiver station determines that the power level of its RF output signal may be maintained at a lower DC prime power level in the power amplifier.

For the purpose of simplicity in further explaining the operation of the present invention, voice, data and/or control signals that are transmitted from a base station transceiver to a mobile unit shall hereinafter be referred to collectively as "forward channel signals." Additionally, voice, data and/or control signals that are transmitted from a mobile unit to a base station transceiver shall hereinafter be referred to collectively as "reverse channel signals." In order to more fully explain the features and advantages of the present invention, it will be helpful to first explain an exemplary embodiment of a conventional wireless infrastructure.

Figure 2:
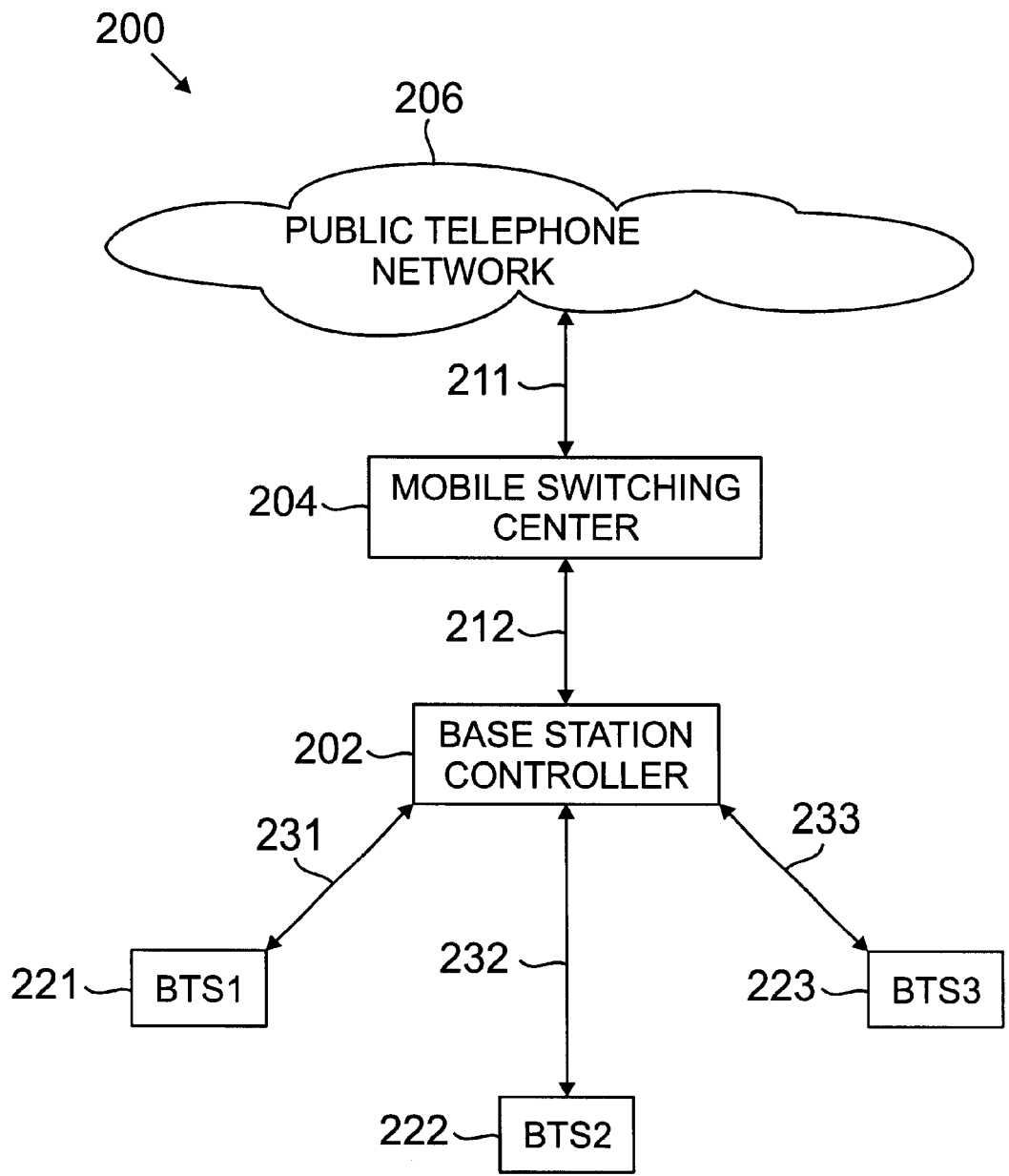
FIG. 2 illustrates an exemplary wireless infrastructure according to the prior art.

FIG. 2 illustrates an exemplary wireless infrastructure 200 according to the prior art. Wireless infrastructure 200 comprises a base station controller (BSC) 202 coupled to a plurality of base transceiver stations 221, 222 and 223 (hereafter, referred to as BTS1, BTS2, and BTS3, respectively) by data links 231, 232 and 233. BTS1, BTS2 and BTS3 engage in two-way voice and data communication with mobile units that are within the respective cell sites serviced by BTS1, BTS2 and BTS3. The base station controller 202 performs device loading of operation and maintenance (O&M) data for BTS1, BTS2, and BTS3. Each of base stations BTS1, BTS2, and BTS3 is separately controlled by the BSC 202. In conventional wireless architectures, data links 231, 232, and 233 are T1 lines or E1 lines.

The BSC 202 is coupled to a mobile switching center 204 by data link 212, which is typically a T1 connection. The mobile switching center (MSC) 204 is a switch interface that provides connections between base station controller 202 and other base station controllers (not shown) and the public telephone network 206. The MSC 204 is connected to the public telephone network 206 by data link 211, which may be, for example, a T1 connection or a T3 connection, depending on traffic conditions.

The data traffic capacity of the wireless infrastructure 200 is limited by the T1 connections between BTS1–BTS3 and the BSC 202. Data that is transferred from BTS1–BTS3 across data links 231–233 is assigned a time slot in each T1 connection. The voice and data signals in the reverse channel messages from the mobile units must compete for bandwidth with various monitored performance data sent to the BSC 202 as part of operation and maintenance data. The monitored data includes received signal strength indicator (RSSI) data, signal-to-noise ($E_b N_o$) data, RF performance data, and the like. The monitored data imposes high bandwidth requirements on the T1 connection, leaving less bandwidth available to handle reverse channel messages. The limited traffic capacity of the wireless infrastructure 200 also limits the performance of applications being executed by the mobile units communicating with BTS1, BTS2, and BTS3. The data from a high bandwidth application transmitted by a mobile unit, such as a video stream, must be divided over many time slots on the T1 connections. This introduces delays and limits the speed at which these applications can be run.

In a typical upgrade of the data traffic capacity of the wireless infrastructure 200, the cell site covered by one of BTS1, BTS2 or BTS3 is divided into multiple sectors that are serviced by the single base station. For example, if BTS1 is split into three cells, a sectored antenna would be installed into BTS1 and the cell site would be divided into three 120 degree sectors. Each of the sectors receives a separate frequency assignment. This approach adds hardware and software limitations on the number of sectors that are required to provide coverage of a cell site and it also imposes frequency limitations on the base transceiver station.

The present invention provides an improved multi-sector and multiple frequency architecture for a wireless infrastructure. The present invention uses a single base station as a server that provides resources to multiple client base transceiver stations, which are configured for different sectors and frequencies and which could be mutually exclusive and independent of one another. The base station server is coupled to a plurality of client base transceiver stations by means of an ISOchronous Ethernet network.

Figure 3:
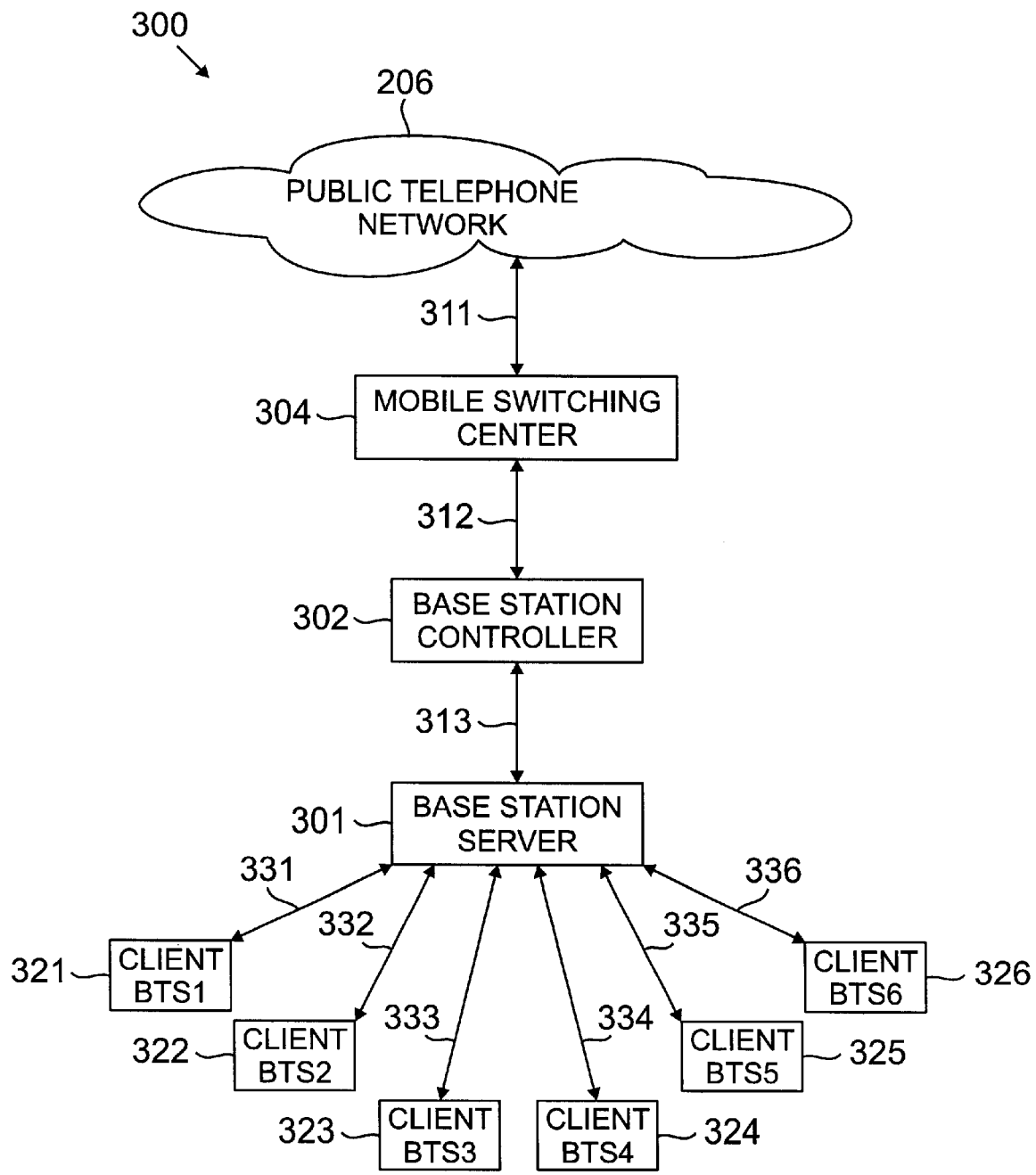
FIG. 3 illustrates an exemplary wireless infrastructure according to one embodiment of the present invention.

FIG. 3 illustrates an exemplary wireless infrastructure according to one embodiment of the present invention. Wireless infrastructure 300 comprises a base station server 301 coupled to a plurality of client base transceiver stations 321 through 326 (hereafter, referred to as client BTS1 through client BTS6, respectively) by ISOchronous Ethernet connections 331 through 336, respectively. Client BTS1 through client BTS6 engage in two-way voice and data communication with mobile units that are within the respective cell sites serviced by client BTS1 through client BTS6. The base station server 301 carries on conventional client-server data transfers according to the IEEE-802.9 protocol specified for ISOchronous Ethernet.

The base station server 301 is coupled to a conventional base station controller (BSC) 302 by a data link 313, which may be a high capacity data connection, such as an ATM or SONET connection. The base station controller 302 performs device loading of operation and maintenance (O&M) data for BTS1 through BTS6. The BSC 302 is coupled to a mobile switching center 304 by data link 312. The mobile switching center (MSC) 304 provides connections between the BSC 302 and other base station controllers (not shown) and the public telephone network 206. The MSC 304 is connected to the public telephone network 206 by data link 311. Data links 311 and 312 may be a high capacity data connections, such as an ATM or SONET connection, to handle high bandwidth applications performed by the mobile units.

Base station server 301 may itself be a base transceiver station capable of transmitting forward channel signals to the mobile units and receiving reverse channel signals from the mobile units. Base station server 301 and client BTS1 through BTS6 therefore comprise a total of seven base transceiver stations that may be deployed to cover the geographical area covered by BTS1, BTS2 and BTS3 in FIG. 2. Each of base station server 301 and client BTS1 through client BTS6 is the functional equivalent of one of BTS 101, BTS 102 or BTS 103 in FIG. 1.

The ISOchronous Ethernet backbone connection is a well-known combination of circuit switched channels and packet switched channels. ISOchronous Ethernet provides the base station server 301 with ninety-six (96) 64 Kbps B channels and one (1) 64 Kbps D channel (normally used for signaling), along with 10 Mbps of Ethernet bandwidth (i.e., 10 base T connection). The 96 B channels, the D channel, and the 10 Mbps Ethernet bandwidth may be distributed among the six clients, client BTS1 through client BTS6. The D channel and each B channel may be mapped to one of client BTS1 through client BTS6 to define a base transceiver station data link (channel indexing). The 10 Mbps of Ethernet bandwidth can be used to gather RSSI data, signal-to-noise $E_b/N_o$) data, RF performance data, and the like, for the air interface in each base transceiver station. Additionally, the 10 Mbps may be used to transfer high bandwidth reverse channel signals, such as video data received by one of client BTS1 through client BTS6.

In a preferred embodiment of the present invention, base station server 301 and each of client BTS1 through client BTS6 use mutually exclusive transmit and receive frequency assignments to cover different sectors. The use of the ISOchronous Ethernet backbone and the ability to map the D channel and the B channels and the 10 Mbps Ethernet bandwidth distribute the base station resource bandwidth among multiple base stations through a single point of contact (point-to-multipoint configuration). A single network address can be used to identify the base station server 301 and client BTS1 through client BTS6.

Figure 4:
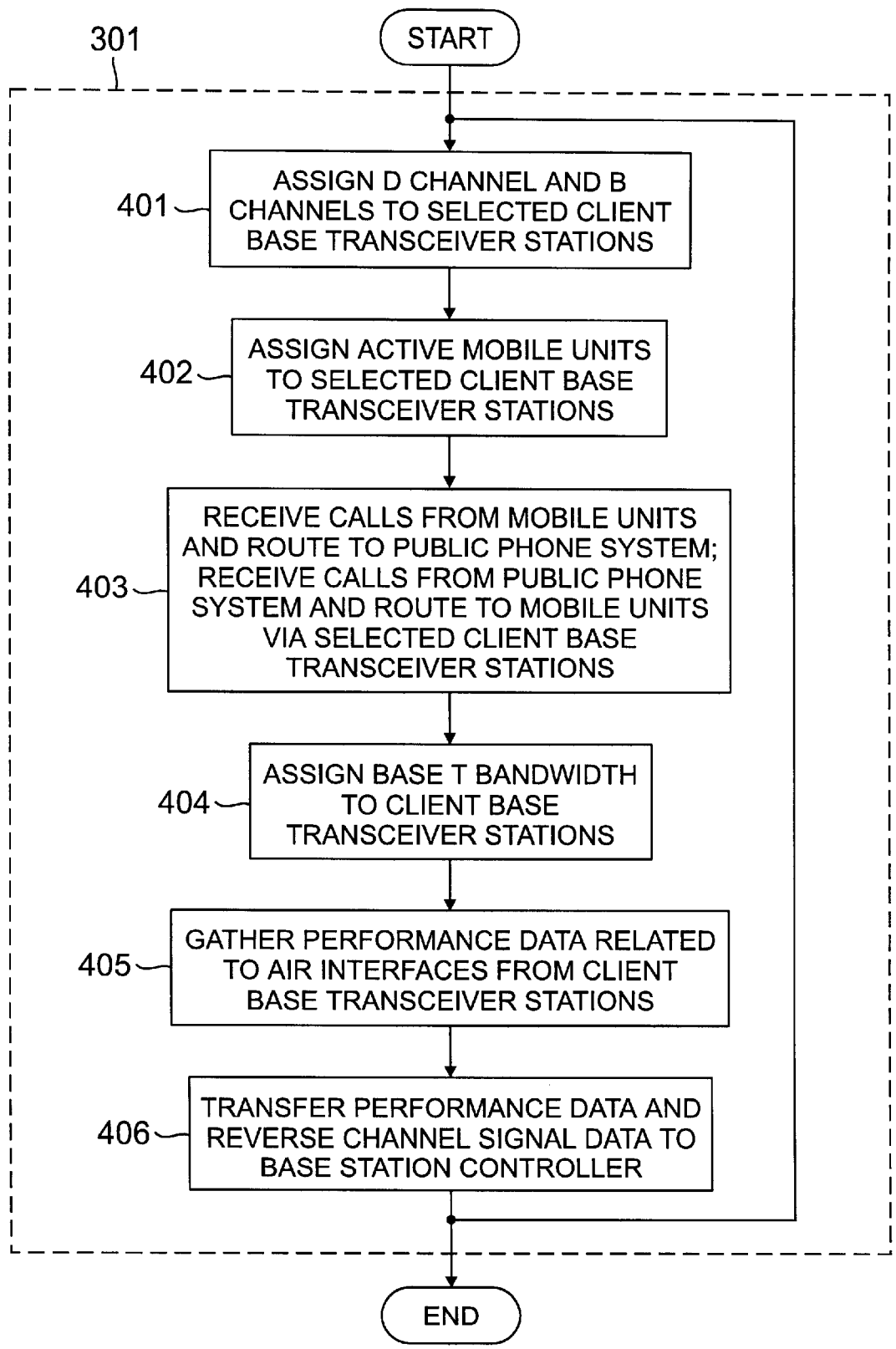
FIG. 4 is a flow chart illustrating the operation of an exemplary base station server according to one embodiment of the present invention.

FIG. 4 is a flow chart illustrating the operation of an exemplary base station server 301 according to one embodiment of the present invention. The base station server 301 assigns the D channel and the 96 B channels to selected client base transceiver stations (process step 401). The number of D/B channels assigned to each client base transceiver station can range from 1 channel to all 97 channels, depending on the number of traffic channels that a particular client base transceiver station handles. Each D/B channel may handle several calls simultaneously from a client base transceiver station. The D/B channels may initially be assigned client base transceiver stations according to a predetermined plan and then reassigned among the client base transceiver stations according to traffic loading.

The base station server 301 assigns mobile units to selected client base transceiver stations according to varying criteria (process step 402). An acceptably strong reverse channel message signal from a given active mobile unit may be received by more than one client base transceiver station. The mobile unit may also receive an acceptably strong forward channel message signal from more than one client base transceiver station. The mobile unit may then send a notification message to one of the client base transceiver stations indicating which client base transceiver station is most strongly received by the mobile unit. The base station server 301 may then assign a client base transceiver station to handle that mobile unit according to which client base transceiver station receives the strongest reverse channel message signal or according to which client base transceiver station is most strongly received by the mobile unit.

Thereafter, the base station server 301 receives calls from the mobile units and routes the voice and data messages to the public telephone network 206. The base station server 301 also receives calls from the public telephone network 206 and forwards the voice and data messages to the mobile units (process step 403). As a roaming mobile unit is handed off from one client base transceiver station to another client base transceiver station, the base station server 301 reassigns the B/D channel that is responsible for handling communications with the mobile unit.

As part of its background operation and maintenance activities, the base station server 301 also gathers performance-related data about the air interfaces. Depending on the number of calls being handled by each of client BTS1 through client BTS6, the base station server 301 assigns a selected amount of the 10 Mbps Ethernet (i.e., 10 base T) bandwidth to each of client BTS1 through client BTS6 (process step 404). At a predefined interval, the base station server downloads from each of the client base transceiver stations data such as RSSI, signal-to-noise ($E_b/N_o$) data, RF performance data, and the like (process step 405).

The base station server 301 then transfers the performance data to the base station controller 302, which performs the actual operation and maintenance data processing. Additionally, the reverse channel signals (i.e., voice and/or data from the mobile units) in the B channels is also transferred to the base station controller 302 and, eventually, the mobile switching center 304 (process step 406).

The foregoing description of the present invention illustrates the advantageous use of a client-server topology in a wireless communication system to create a multi-sector, multifrequency base station system. The client-server backbone allows the flexible assignment of B channels and the 10 Mbps Ethernet bandwidth to thereby allow easy expansion of cell sites.

Although the present invention has been described in detail, those skilled in the art should understand that they can make various changes, substitutions and alterations herein without departing from the spirit and scope of the invention in its broadest form.

What is claimed is:

1. For use in a wireless communication system, an infrastructure comprising:
   a plurality of client base transceiver stations operable to transmit voice and data signals to mobile units within said wireless communication system and to receive voice and data signals from said mobile units; and
   a base station server coupled to said plurality of client base transceiver stations via a client-server backbone architecture utilizing an ISOchronous Ethernet client-server protocol, said base station server operable to transfer said voice and data signals between said plurality of base transceiver stations and an external wired communication system.

2. The infrastructure set forth in claim 1 wherein each of said plurality of client base transceiver stations operates under a CDMA access protocol.

3. The infrastructure set forth in claim 1 wherein said base station server comprises a base station transceiver operable to transmit voice and data signals to said mobile units and to receive voice and data signals from said mobile units.

4. The infrastructure set forth in claim 2 wherein each of said plurality of client base transceiver stations is assigned to selected transmit and receive frequencies.

5. The infrastructure set forth in claim 4 wherein selected transmit and receive frequencies assigned to said plurality of client base transceiver stations are mutually exclusive.

6. The infrastructure set forth in claim 4 wherein said base station server assigns a sub-channel in said ISOchronous Ethernet to a selected wireless communication link between one of said plurality of base transceiver stations and a mobile unit.

7. The infrastructure as set forth in claim 6 wherein said base station server is operable to reassign the subchannel in said ISOchronous Ethernet to another of said base transceiver stations according to traffic loading on said base transceiver station.

8. The infrastructure set forth in claim 4 wherein said base station server receives from at least one of said plurality of base transceiver stations at least one of received signal strength indicator data and signal-to-noise data related to a selected wireless communication link between said at least one base transceiver station and a selected mobile unit.

9. A wireless communication system for communicating with a plurality of mobile units comprising:
   a mobile switching center for transmitting voice and data signals from an external wired communication system;
   an infrastructure coupled to said mobile switching center comprising:
      a plurality of client base transceiver stations operable to transmit voice and data signals to said mobile units and to receive voice and data signals from said mobile units; and
      a base station server coupled to said plurality of client base transceiver stations via a client-server backbone architecture utilizing an ISOchronous Ethernet client-server protocol, said base station server operable to transfer said voice and data signals between said plurality of base transceiver stations and an external wired communication system; and
   a base station controller coupled to said mobile switching center for controlling said base station server.

10. The wireless communication system set forth in claim 9 wherein each of said plurality of client base transceiver stations operates under a CDMA access protocol.

11. The wireless communication system set forth in claim 9 wherein said base station server comprises a base station transceiver operable to transmit voice and data signals to said mobile units and to receive voice and data signals from said mobile units.

12. The wireless communication system set forth in claim 10 wherein each of said plurality of client base transceiver stations is assigned to selected transmit and receive frequencies.

13. The wireless communication system set forth in claim 10 wherein selected transmit and receive frequencies assigned to said plurality of client base transceiver stations are mutually exclusive.

14. The wireless communication system set forth in claim 12 wherein said base station server assigns a sub-channel in said ISOchronous Ethernet to a selected wireless communication link between one of said plurality of base transceiver stations and a mobile unit.

15. The wireless communication system set forth in claim 12 wherein said base station server receives from at least one of said plurality of base transceiver stations at least one of received signal strength indicator data and signal-to-noise data related to a selected wireless communication link between said at least one base transceiver station and a selected mobile unit.

16. The wireless communication system as set forth in claim 14 wherein said base station server is operable to reassign the subchannel in said ISOchronous Ethernet to another of said base transceiver stations according to traffic loading on said base transceiver station.

17. For use in a wireless communication system, a method of transferring voice and data signals transmitted to and received from a mobile unit, the method comprising the steps of:

receiving from the mobile unit a signal operable to initiate a wireless communication link in a client base transceiver station operable to transmit voice and data signals to the mobile unit and to receive voice and data signals from the mobile unit;

notifying a base station server coupled to the client base transceiver station of an initiation of the wireless communication link, wherein the base station server and the client base transceiver station communicate utilizing an ISOchronous Ethernet client-server protocol; and assigning a channel in the client-server protocol to the wireless communication link.

18. The method set forth in claim 17 wherein the client base transceiver station operates under a CDMA access protocol.

19. The method set forth in claim 17 wherein the base station server receives from the client base transceiver station RF performance data related to the wireless communication link between the client base transceiver station and the mobile unit.

20. The method set forth in claim 19 wherein said base station server assigns a sub-channel in said ISOchronous Ethernet to a selected wireless communication link between one of said plurality of base transceiver stations and a mobile unit; and operable to reassign the sub-channel in said ISOchronous Ethernet to another of said plurality of base transceiver stations according to traffic loading on said base transceiver station.

* * * * *